US007693379B2

(12) United States Patent
Imamura

(10) Patent No.: US 7,693,379 B2
(45) Date of Patent: Apr. 6, 2010

(54) HOLEY FIBER

(75) Inventor: Katsunori Imamura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/245,855

(22) Filed: Oct. 6, 2008

(65) Prior Publication Data

US 2009/0097810 A1 Apr. 16, 2009

(30) Foreign Application Priority Data

Oct. 11, 2007 (JP) ............................ 2007-265663

(51) Int. Cl.
*G02B 6/032* (2006.01)

(52) U.S. Cl. ...................................................... 385/125

(58) Field of Classification Search .................. 385/125
See application file for complete search history.

(56) References Cited

U.S. PATENT DOCUMENTS

2002/0164136 A1* 11/2002 Fukuda et al. .............. 385/125

OTHER PUBLICATIONS

J. C. Knight, et al., "Anomalous Dispersion in Photonic Crystal Fiber", IEEE Photonics Technology Letters, vol. 12, No. 7, Jul. 2000, pp. 807-809.

Crystal Fibre A/S, "Nonlinear Photonic Crystal Fibers Selected Datasheets 800 NM Fibers NL-800 List", [online], [search on Sep. 26, 2007], internet (URL:http://www.crystal-fibre.com/products/nonlinear.shtm).

Jinendra K. Ranka, et al., "Optical properties of high-delta air-silca microstructure optical fibers", Optics Letters, vol. 25, No. 11, Jun. 1, 2000, pp. 796-798.

* cited by examiner

*Primary Examiner*—Jerry T Rahll
(74) *Attorney, Agent, or Firm*—Oblon, Spivak, McClelland, Maier & Neustadt, L.L.P.

(57) ABSTRACT

A holey fiber, which has a zero-dispersion wavelength of less than 700 nm and operates as single mode under its zero-dispersion wavelength, is provided. The holey fiber according to the present invention comprises a core region that is formed at a center of the holey fiber; and a cladding region, formed at the circumference of the core region, which has a plurality of holes distributed as triangle lattice around the core region; wherein the holey fiber has a fundamental mode of less than 700 nm, a higher order mode, and the fundamental mode and the higher order mode confinement losses of less than 0.1 dB/m and more than 10 dB/m, respectively, at the zero-dispersion wavelength.

2 Claims, 9 Drawing Sheets d
Λ
L
10
11
12
13

HOLEY FIBER

CROSS-REFERENCE TO RELATED APPLICATIONS

This application claims the benefit of priority from Japanese Patent Application No. 2007-265663 filed Oct. 11, 2007, the entire contents of which is incorporated herein by reference.

TECHNICAL FIELD

The present invention relates to a holey fiber which has a core region that is formed at a center of the holey fiber; and a cladding region, formed at the circumference of the core region, which has a plurality of holes distributed as triangle lattice around the core region.

BACKGROUND OF THE INVENTION

A holey fiber or a photonic-crystal fiber is a new type of an optical fiber which has a core region at the center of the optical fiber and a cladding region formed at the circumference of the core region, which has plurality of holes distributed around the core region. The holes in the cladding lower the average refractive index and by using the principle of total reflection in light, the fiber propagates light in a core region. The holey fiber enables characteristic(s), which is impossible for ordinal optical fibers, by controlling the refractive index using the holes.

At the same time, by using non-linear optical phenomenon in optical fibers, SC (Supercontinuum) light source, which generates a SC light with extremely wide wavelength spectrum, is investigated widely. Development of optical fibers for SC light source is primarily done in a communication wavelength spectrum mainly at 1550 nm. Recently, optical fibers for SC light source in 1050 nm band, which can use Yb doped optical amplifier, and in 850 nm band, which can use fiber lasers, are also started to be investigated.

Optical fibers for SC light source must have its zero-dispersion wavelength in neighborhood of wavelength to be used. However, ordinary silica-base optical fiber has negative material dispersion at the wavelength below 1270 nm and the waveguide dispersion cannot be positive. Therefore, at the wavelength below 1270 nm, the wavelength dispersion cannot be zero. However, by using a holey fiber, the structure can be optimized to have an positive waveguide dispersion and there are studies to create holey fibers which can have zero-dispersion wavelength at 1050 nm, at 850 nm or at the wavelength below those numbers (see, for example, 1) J. C. Knight et al., "Anomalous Dispersion in Photonic Crystal Fiber" IEEE Photonics Technology Letters, vol. 12, p. 807 (2000); 2) CRYSTAL FIBRE A/S "NONLINEAR PHOTONIC CRYSTAL FIBERS SELECTED DATASHEETS 800 NM FIBERS NL-800 list", [online], [searched on Sep. 26, 2007], internet (URL: http://www.crystal-fibre.com/products/nonlinear.shtm); and 3) J. K. Ranka et al., "Optical properties of high-delta air-silica microstructure optical fiber" Optics Letters, vol. 25, p. 796 (2000).

However, when structure of a holey fiber is optimized to have large positive waveguide dispersion, confinement of light into a core region becomes extremely strong, and, a higher order mode(s) will exist as a propagation mode(s) under the zero-dispersion wavelength, in addition to the fundamental mode. Therefore, the holey fiber becomes a multi-mode optical fiber.

For example, according to above J. C. Knight et al., "Anomalous Dispersion in Photonic Crystal Fiber" reference, extremely short wavelength holey fiber with zero-dispersion wavelength of 565 nm is reported. However, this holey fiber works as multi-mode at the zero-dispersion wavelength. Also, according to above CRYSTAL FIBRE A/S "NONLINEAR PHOTONIC CRYSTAL FIBERS SELECTED DATASHEETS 800 NM FIBERS NL-800 List" reference, holey fibers with zero-dispersion wavelength of less than 700 nm are reported. However, those holey fibers have cut-off wavelength(s) larger than the zero-dispersion wavelength, and therefore, it works as multi-mode.

Also, according to above J. C. Knight et al., "Anomalous Dispersion in Photonic Crystal Fiber" reference, a holey fiber, which acts as single mode at its zero-dispersion wavelength of 700 nm, is also reported. In addition, according to above CRYSTAL FIBRE A/S "NONLINEAR PHOTONIC CRYSTAL FIBERS SELECTED DATASHEETS 800 NM FIBERS NL-800 List" reference, a holey fiber, which acts as single mode at its zero-dispersion wavelength of 750 nm, is also reported. Furthermore, according to above J. K. Ranka et al., "Optical properties of high-delta air-silica microstructure optical fiber", a holey fiber with a zero-dispersion of 765 nm is reported. This holey fiber has higher order mode(s) at its zero-dispersion wavelength, but since difference in effective refractive indexes between a fundamental mode and the higher order modes are large, it is reported that it can practically be used as single mode.

If a holey fiber has its zero-dispersion wavelength at visible light spectrum of less than 700 nm and can operate as single mode at its zero-dispersion wavelength, it can be easily used as a visible light spectrum SC light source. For example, it is considered to serve many uses as a light source for various optical sensors. However, ordinal holey fibers with its zero-dispersion wavelength of less than 700 nm operate as multi-mode at its zero-dispersion wavelength. Because of that, mode interference and/or modal dispersion is generated and it causes problem for applications which requires high dispersion control such as SC light source.

SUMMARY OF THE INVENTION

The purpose of this present invention is to provide a holey fiber which has its zero-dispersion wavelength of less than 700 nm and acts as single mode at the zero-dispersion wavelength.

To solve the above issue and to achieve the above purpose, a holey fiber according to the present invention comprises a core region that is formed at a center of the holey fiber; and a cladding region, formed at the circumference of the core region, which has a plurality of holes distributed as triangle lattice around the core region; wherein the holey fiber has a fundamental mode zero-dispersion wavelength of less than 700 nm, a higher order mode, and the fundamental mode and the higher order mode confinement losses of less than 0.1 dB/m and more than 10 dB/m, respectively, at the fundamental mode zero-dispersion wavelength.

The plurality of the holes in the holey fiber also create a two-layer of equilateral hexagon shape around the core region, $d/\Lambda$ of 0.7 to 0.97, and $\Lambda$ of 0.55 to 1.2 μm, where d is diameter of the holes μm and $\Lambda$ is lattice constant of a triangle lattice.

BRIEF DESCRIPTION OF THE DRAWINGS

Referring now to the drawings.

DETAILED DESCRIPTION

In the following, detailed description of embodiments of holey fibers according to the present invention is explained by referencing FIGures. While various embodiments of the present invention are described below, it should be understood that they are presented by way of example, and are not intend to limit the applications of the presented invention. Also, if terms are not defined in this specification, those terms are accordance with definitions and measuring method of International Telecommunication Union Telecommunication Standardization Sector (ITU-T) G.650.1.

Figure 1:
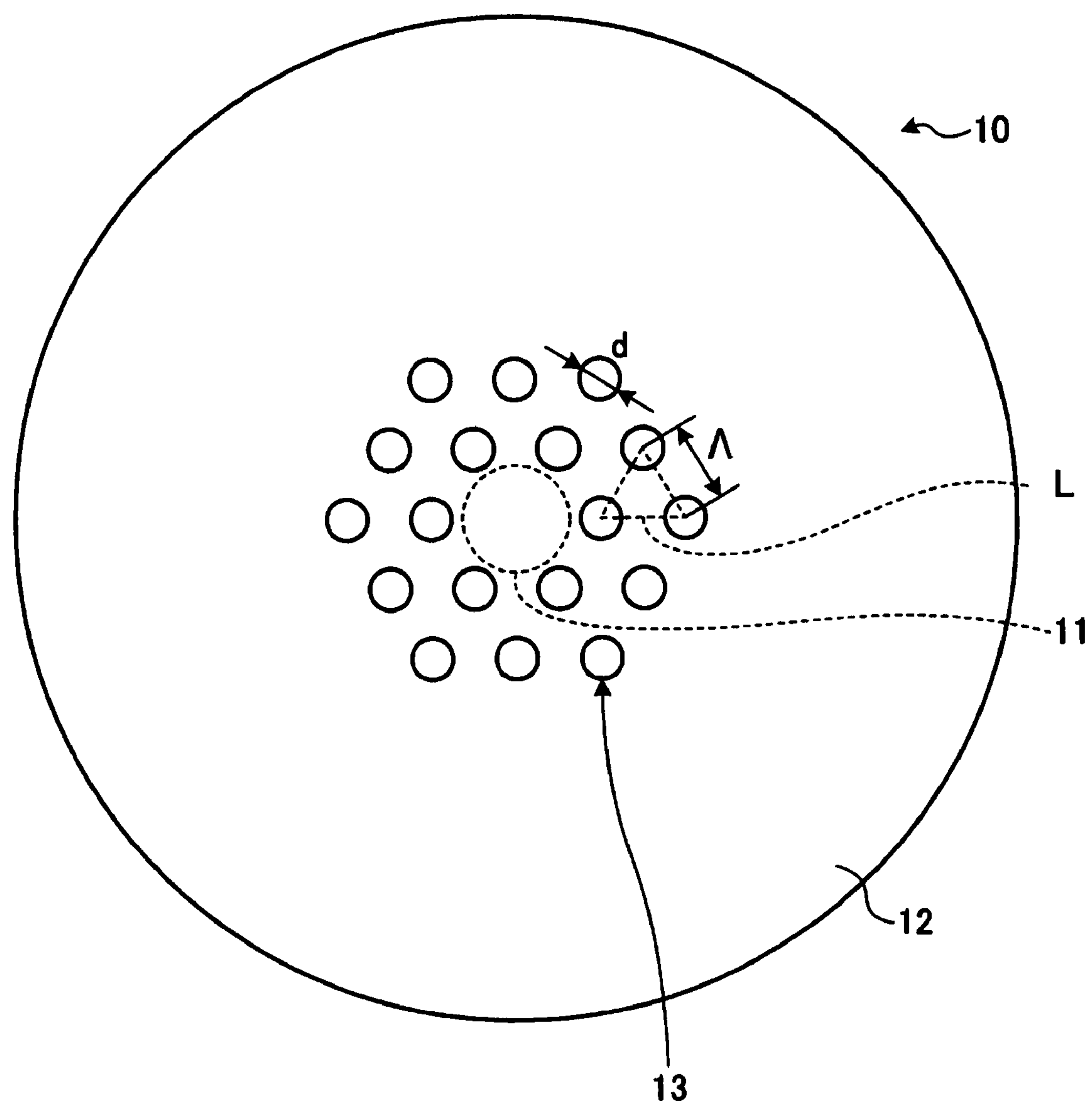
FIG. 1 is a schematic cross section of a holey fiber according to the present invention.

FIG. 1 is a schematic cross section of a holey fiber according to one of the embodiments of the present invention. As shown in FIG. 1, the holey fiber 10 has a core region 11 at the center of the fiber and a cladding region 12 formed at the circumference of the core region 11. The core region 11 and the cladding region 12 are both made from pure silica glass which is not doped with any dopants for controlling its refractive index.

The cladding region 12 has holes 13 around the circumference of the core region 11. The holes 13 are distributed as triangular lattice, L. The diameters of the holes 13 are all represented as d, and lattice constants of the triangular lattices, L, in the other word, center distances of the holes 13 are represented as Λ. Also, the holes 13 are placed such that they create equilateral hexagon shapes around the core region 11. In the case of the holey fiber 10, placements of the holes 13 are such that they make two layers of the equilateral hexagon shape.

The holey fiber 10 has a fundamental mode (HE11) at its zero-dispersion wavelength of less than 700 nm and at least one higher order mode at the zero-dispersion wavelength. However, at the zero-dispersion wavelength, the holey fiber 10 has sufficiently small loss of less than 0.1 dB/m in a fundamental mode confinement loss and sufficiently large loss of more than 10 dB/m in higher order mode confinement losses. In consequence, even if lights in the higher order modes are excited in the holey fiber 10, the lights only propagate few distances, and then it leaks out immediately afterward. This makes intensity of the light rapidly attenuate. In the result, the holey fiber 10 can practically propagate in single-mode at the zero-dispersion wavelength.

In addition, as for the diameters of the holes 13, d, and the lattice constants of the triangle lattice, Λ, if d/Λ is 0.7~0.97 and Λ is 0.55~1.2 μm, then the holey fiber 10, which has a fundamental mode at its zero-dispersion wavelength of less than 700 nm and higher order modes at the zero-dispersion wavelength, has less than 0.1 dB/m in fundamental mode confinement loss and sufficiently large loss of more than 10 dB/m in higher order mode confinement losses at the zero-dispersion wavelength. For example, if d/Λ is 0.97 and Λ is 0.55 μm, the zero-dispersion wavelength is approximately 510 nm, and the fiber has sufficiently small loss of less than 0.03 dB/m in fundamental mode confinement loss and approximately 11 dB/m in TE01 higher order mode confinement loss. Confinement losses of higher order modes other than TE01 are even higher than loss in TE01.

Below, design parameters of the holey fiber 10 according to the present invention and its characteristics obtained from such design parameters are explained using results obtained from finite element method (FEM). In the below explanation, a higher order mode means TE01 mode which has the highest effective index of refraction among all of the higher order modes in the holey fiber 10, in other word, it has smallest confinement loss among all higher order modes.

Figure 2:
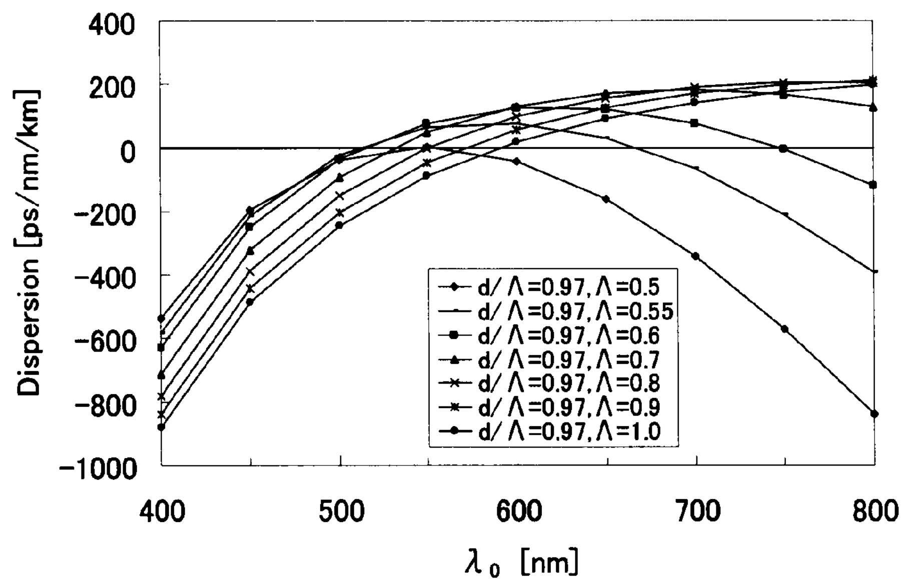
FIG. 2 is a graph which shows wavelength dispersion characteristics of a fundamental mode when d/Λ is fixed at 0.97 and Λ is varied.

FIG. 2 is a graph which shows wavelength dispersion characteristics of fundamental mode when d/Λ is fixed at 0.97 and Λ is varied. As FIG. 2 shows, when Λ is 0.55 μm, it has shortest wavelength of approximately 510 nm and by making Λ small, zero-dispersion wavelength shifts to longer wavelength. Thus, by setting Λ at 0.55 μm, the zero-dispersion wavelength becomes shortest.

Figure 3:
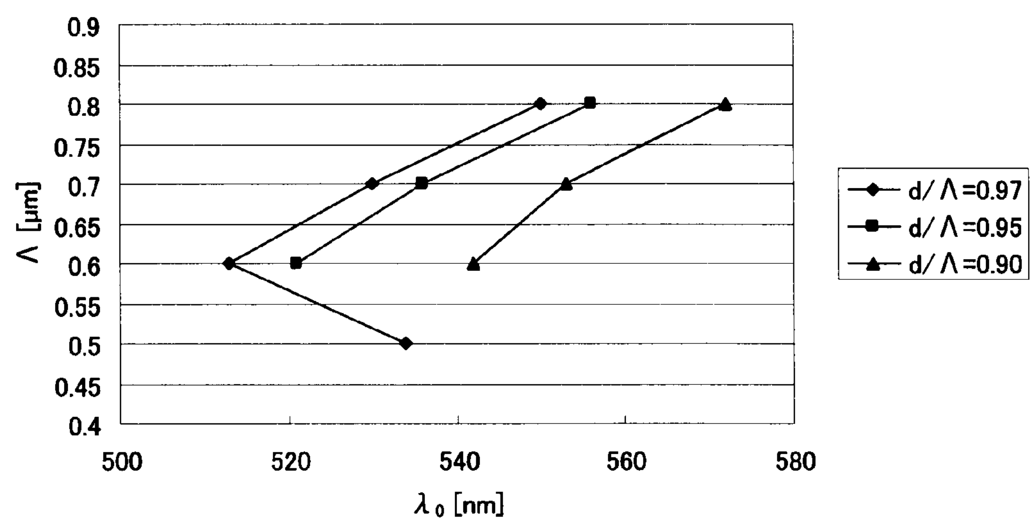
FIG. 3 is a graph which shows relationship between a zero-dispersion wavelength λ0 and Λ when d/Λ are fixed at 0.97, 0.95 and 0.9.

FIG. 3 is a graph which shows relationship between a zero-dispersion wavelength λ0 and Λ when d/Λ are fixed at 0.97, 0.95 and 0.9. As FIG. 2 shows, if Λ is the same, by increasing d/Λ, the zero-dispersion wavelength shift to shorter wavelength. Also, in cases of d/Λ at 0.95 and 0.90, there is no zero-dispersion wavelength which makes the wavelength dispersions negative at all the wavelength spectrum less than 700 nm.

Figure 4:
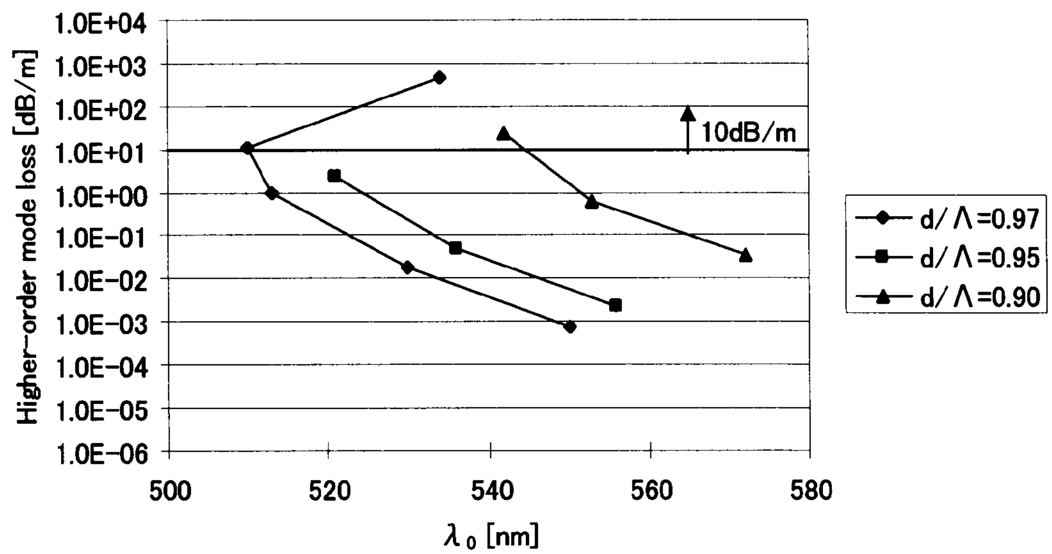
FIG. 4 is a graph which shows relationship between a zero-dispersion wavelength λ0 and confinement loss of a higher order mode when d/Λ are fixed at 0.97, 0.95 and 0.9.
Figure 5:
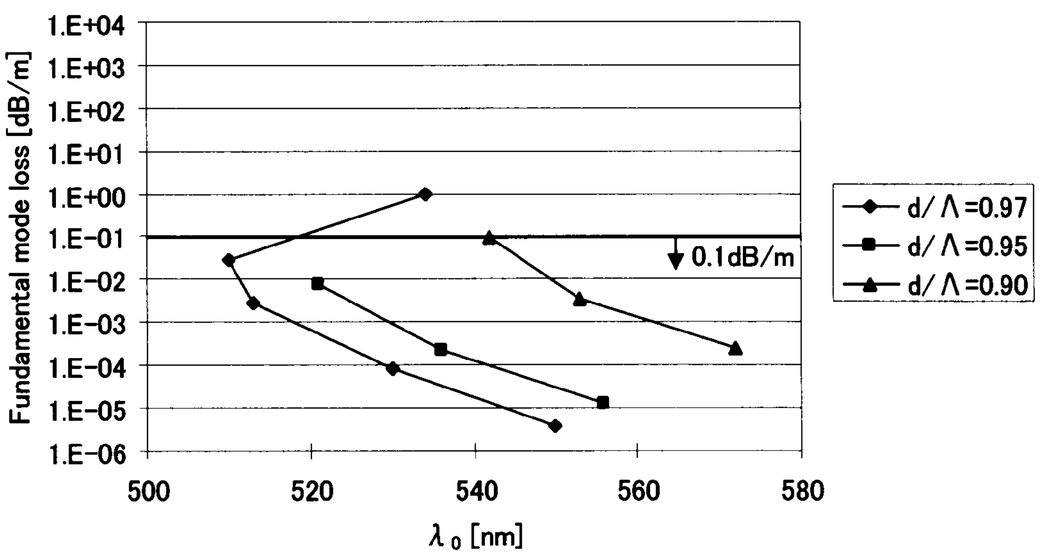
FIG. 5 is a graph which shows relationship between a zero-dispersion wavelength λ0 and confinement loss of a fundamental mode when d/Λ are fixed at 0.97, 0.95 and 0.9.

FIGS. 4 and 5 are graphs which shows relationship between the zero-dispersion wavelength λ0 and confinement loss of a higher order mode and a fundamental mode, respectively, when d/Λ are fixed at 0.97, 0.95 and 0.9. In addition, each data points in FIGS. 4 and 5 are corresponding with each data points in FIG. 3. For example, a data point with a zero-dispersion wavelength of approximately 570 nm has d/Λ of 0.9 and Λ of 0.8 μm. As FIG. 4 shows, when d/Λ is 0.97 and a zero-dispersion wavelength of approximately 510 nm (therefore, Λ is 0.55 μm), confinement loss of a higher order mode is more than 10 dB/m and substantial single mode transmission is possible. As FIG. 5 shows, when d/Λ is 0.97 and Λ is 0.55 μm, confinement loss of a fundamental mode is less than 0.1 dB/m and low loss propagation of light is possible.

Furthermore, large confinement loss in the higher order mode and small confinement loss of the fundamental mode mean difference in effective refractive indexes between the higher order mode and the fundamental mode is large. Therefore, when d/Λ is 0.97 and Λ is 0.55 μm, degradation of quality in propagating light due to mode interference is sufficiently suppressed.

Figure 6:
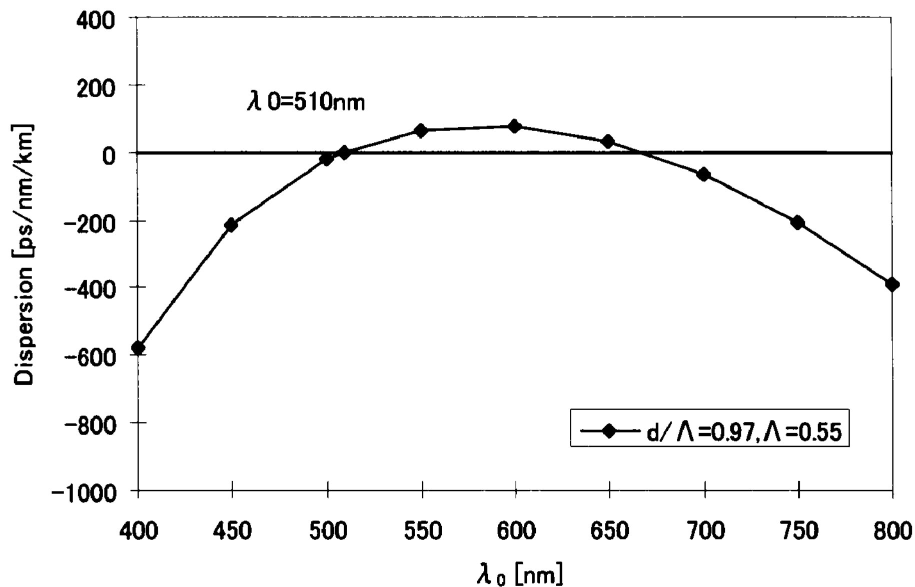
FIG. 6 is a graph which shows wavelength dispersion characteristics when d/Λ is fixed at 0.97 and Λ is at 0.55 μm.

The following explains the characteristics of the holey fiber 10 when d/Λ is 0.97 and Λ is 0.55 μm. FIG. 6 is a graph which shows wavelength dispersion characteristics of a fundamental mode when d/Λ is fixed at 0.97 and Λ is at 0.55 μm. As FIG. 6 shows, a zero-dispersion wavelength on shorter wavelength side is 510 nm and it can be used as an optical fiber for SC light generation around the wavelength of 510 nm.

Figure 7:
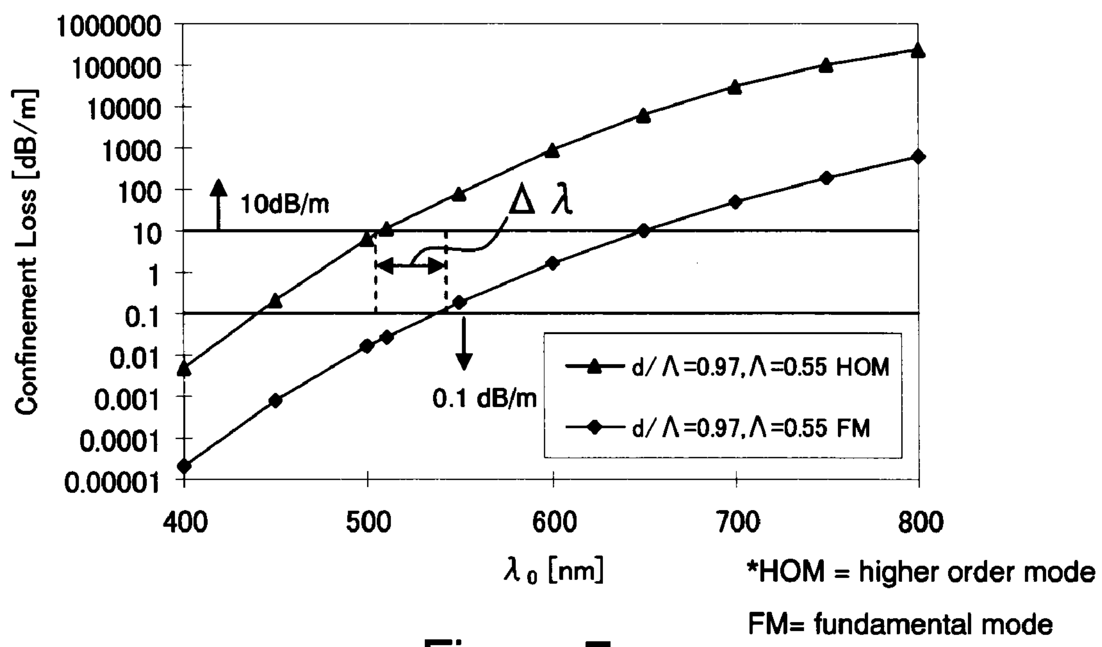
FIG. 7 is a graph which shows confinement loss wavelength dependency in a fundamental and a higher order modes when d/Λ is fixed at 0.97 and Λ is at 0.55 μm.

FIG. 7 is a graph which shows confinement loss wavelength dependency in fundamental and higher order modes when d/Λ is fixed at 0.97 and Λ is at 0.55 μm. As FIG. 7 shows, wavelength spectrum, Δλ, where the fundamental mode and the higher order mode confinement losses of less than 0.1 dB/m and more than 10 dB/m, respectively, is between approximately 510 nm and 540 nm.

Figure 8:
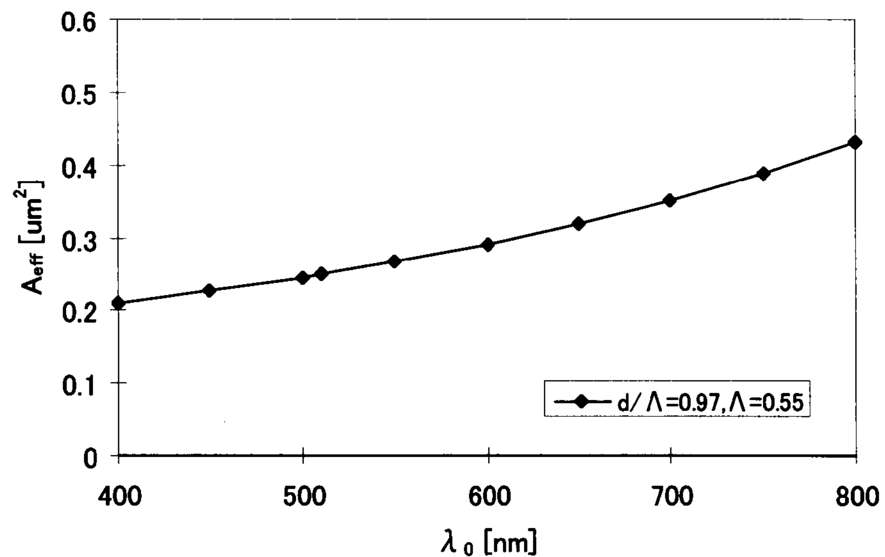
FIG. 8 is a graph which shows wavelength dependency in effective core cross area, Aeff, when d/Λ is fixed at 0.97 and Λ is at 0.55 μm.

FIG. 8 is a graph which shows wavelength dependency in effective core cross area, Aeff, when d/Λ is fixed at 0.97 and Λ is at 0.55 μm. As FIG. 8 shows, at the zero-dispersion wavelength of approximately 510 nm, effective core cross section, for example, is substantially small area of approximately 0.25 $\mu m^2$. It makes optical nonlinearity higher and the fiber is suited for generating SC light.

Figure 9:
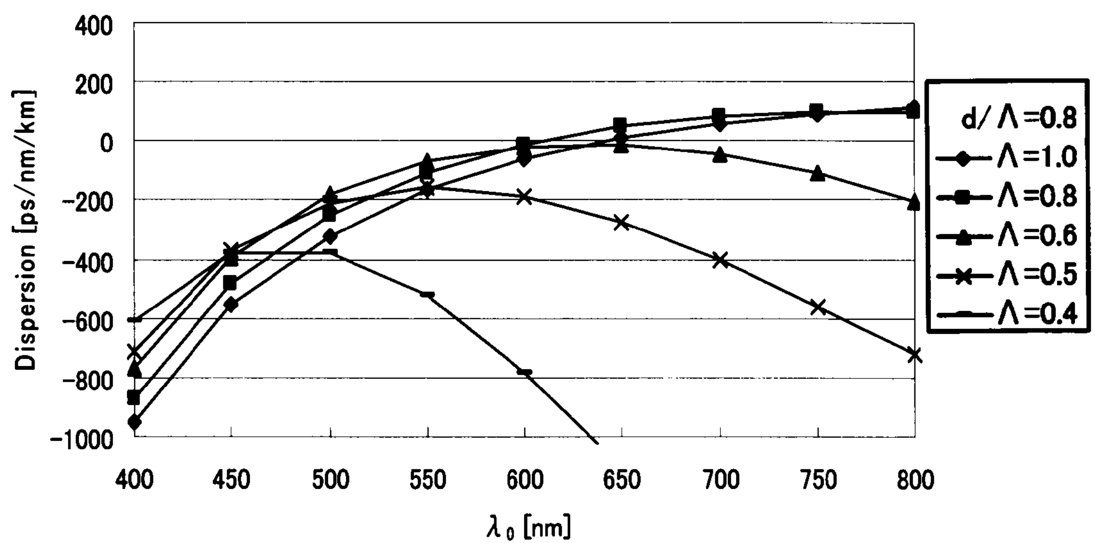
FIG. 9 is a graph which shows wavelength dispersion characteristics of a fundamental mode when d/Λ is fixed at 0.8 and Λ is varied.

Next, characteristics of the holey fiber 10 when d/Λ is varied are explained. FIG. 9 is a graph which shows wavelength dispersion characteristics of a fundamental mode when d/Λ is fixed at 0.8 and Λ is varied. As FIG. 9 shows, zero-dispersion wavelength shifts to shorter wavelength side as Λ is reduced. When Λ is at 0.8 μm, it has shortest wavelength of approximately 600 nm. However, if Λ is reduced further, the maximum value of the wavelength dispersion curve does not reach zero and therefore there is no zero-dispersion wavelength.

Figure 10:
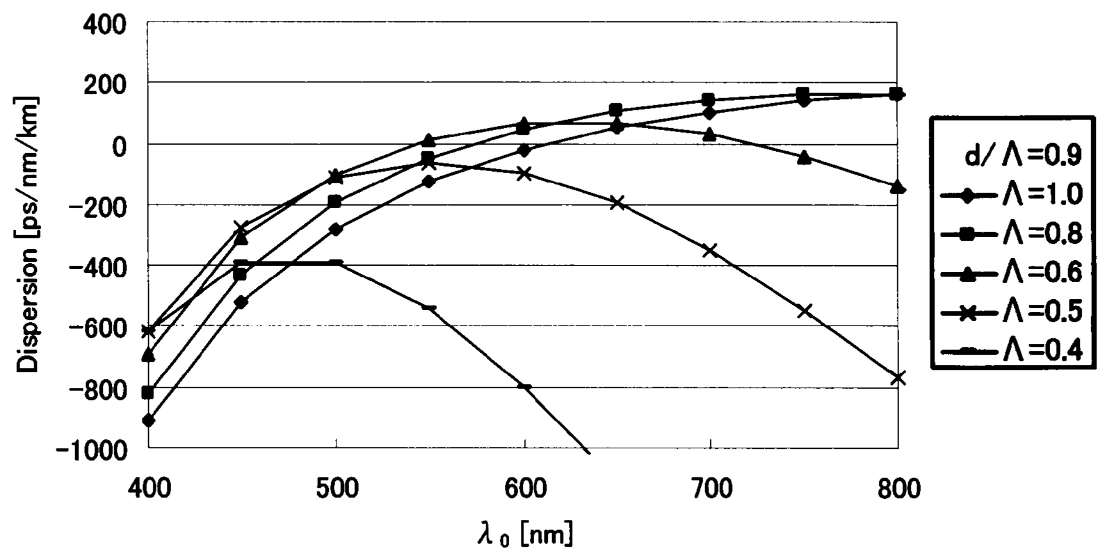
FIG. 10 is a graph which shows wavelength dispersion characteristics of a fundamental mode when d/Λ is fixed at 0.9 and Λ is varied.

FIG. 10 is a graph which shows wavelength dispersion characteristics of a fundamental mode when d/Λ is fixed at 0.9 and Λ is varied. As FIG. 10 shows, in this case also, the zero-dispersion wavelength shifts to shorter wavelength side as Λ is reduced. When Λ is at 0.6 μm, it has shortest wavelength of approximately 550 nm. However, if Λ is reduced further, there is no zero-dispersion wavelength.

Figure 11:
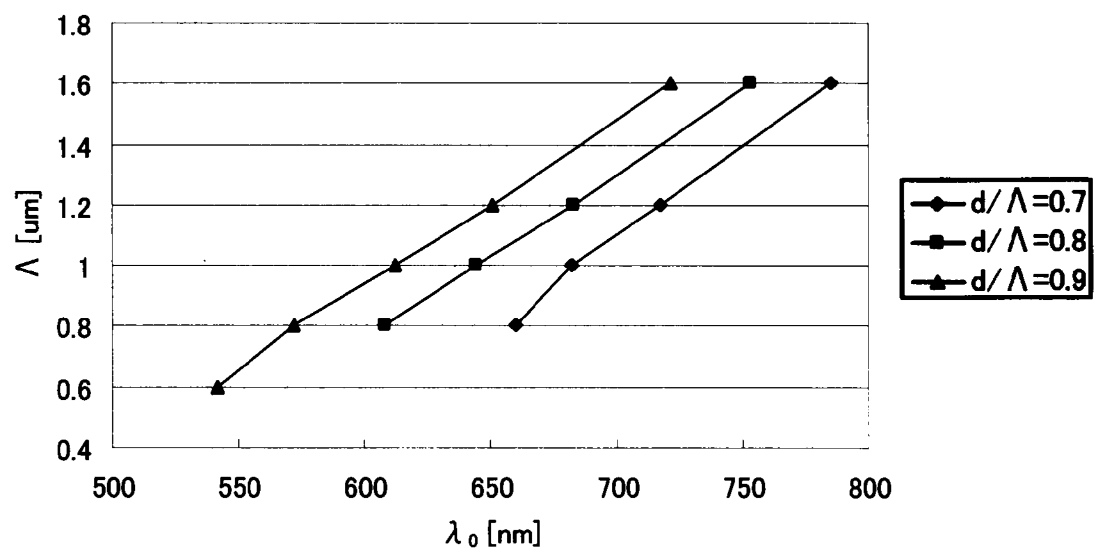
FIG. 11 is a graph which shows relationship between a zero-dispersion wavelength, λ0, and Λ, when d/Λ is fixed at 0.7, 0.8 and 0.9.
Figure 12:
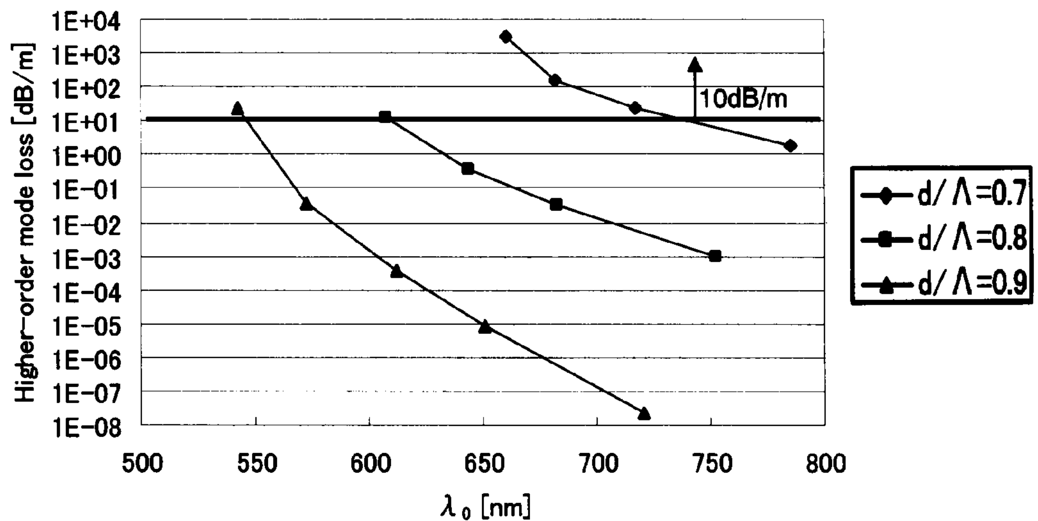
FIG. 12 is a graph which shows relationship between a zero-dispersion wavelength, λ0, and confinement loss of a higher order mode, when d/Λ is fixed at 0.7, 0.8 and 0.9.
Figure 13:
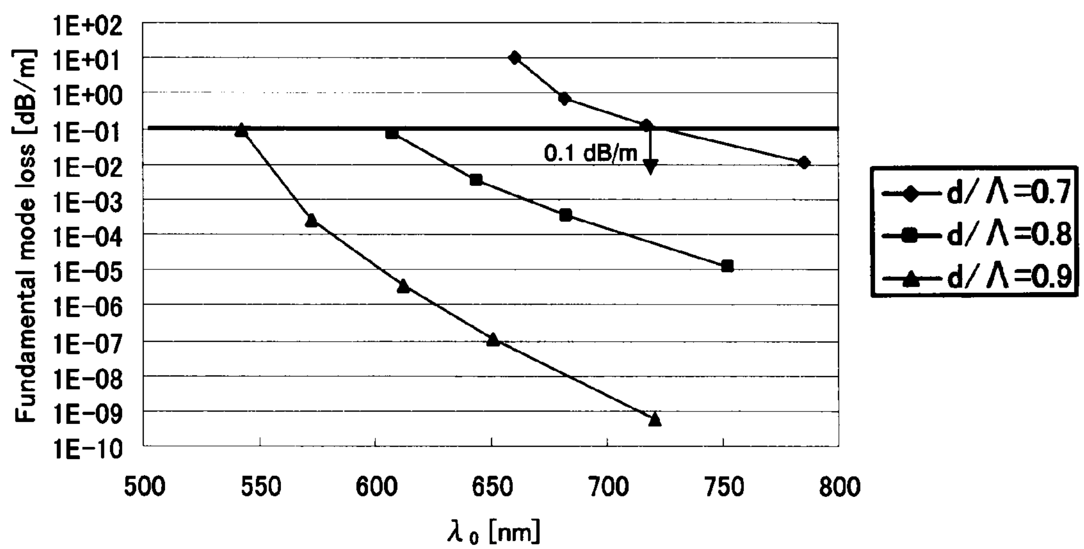
FIG. 13 is a graph which shows relationship between a zero-dispersion wavelength, λ0, and confinement loss of a fundamental mode, when d/Λ is fixed at 0.7, 0.8 and 0.9.

FIGS. 11 to 13 are graphs which show relationship between a zero-dispersion wavelength, λ0, and Λ, between a zero-dispersion wavelength, λ0, and confinement loss of higher order mode, and between a zero-dispersion wavelength, λ0, and confinement loss of a fundamental mode, respectively, when d/Λ is fixed at 0.7, 0.8 and 0.9. In addition, each data points in FIGS. 12 and 13 corresponds with each data points in FIG. 11. As FIG. 11 shows, if they have the same Λ, by increasing d/Λ, the zero-dispersion wavelength shifts to shorter wavelength side. Also, as FIG. 12 shows, if they have the same zero-dispersion wavelength or the same Λ, by reducing d/Λ, confinement loss of the higher order mode becomes larger. Also, as FIG. 13 shows, if they have the same zero-dispersion wavelength or the same Λ, by increasing d/Λ, confinement loss of the fundamental mode becomes smaller.

From keen examination of the above results (including FIGS. 2 to 13), according to the inventors for the present invention, under the holey fiber 10 in FIG. 1, if d/Λ is between 0.7 and 0.97 and Λ is between 0.55 and 1.2 μm, where d is diameters of the holes 12 and Λ is lattice constants of the triangle lattices, L, the fiber can satisfy its zero-dispersion wavelength of a fundamental mode in less than 700 nm, has a higher order mode(s) at the zero-dispersion wavelength at the zero-dispersion wavelength, and has the fundamental mode confinement loss of less than 0.1 dB/m and the higher order mode confinement losses of more than 10 dB/m. The table below shows typical design parameters and corresponding calculation results of its characteristics are shown as examples 1 to 5.

| | d/Λ — | Λ μm | λ0 nm | Loss in fundamental mode dB/m | Loss in higher order mode dB/m |
|---|---|---|---|---|---|
| Example 1 | 0.716 | 1.13 | 699 | 0.098 | 16.4 |
| Example 2 | 0.75 | 0.98 | 659 | 0.074 | 11.0 |
| Example 3 | 0.8 | 0.8 | 608 | 0.076 | 11.4 |
| Example 4 | 0.9 | 0.6 | 542 | 0.093 | 23.5 |
| Example 5 | 0.97 | 0.55 | 510 | 0.027 | 10.9 |

In above explanation, relationships between the holey fiber 10 and d/Λ and between the holey fiber 10 and Λ are explained. Next, relationship between number of hole layers and characteristics of holey fiber is explained. Also, in the below explanation, the holey fiber 10 shown in FIG. 1 is called as a two-hole layer holey fiber. Also, a holey fiber with third-hole layer around two-hole layer holey fiber of the core region 11 of the holey fiber 10 is called as three-hole layer holey fiber. Also, a holey fiber without second-hole layer around the holey fiber in the core region 11 of holey fiber 10 (kept inner most hole layer) is called as one-hole layer holey fiber.

Figure 14:
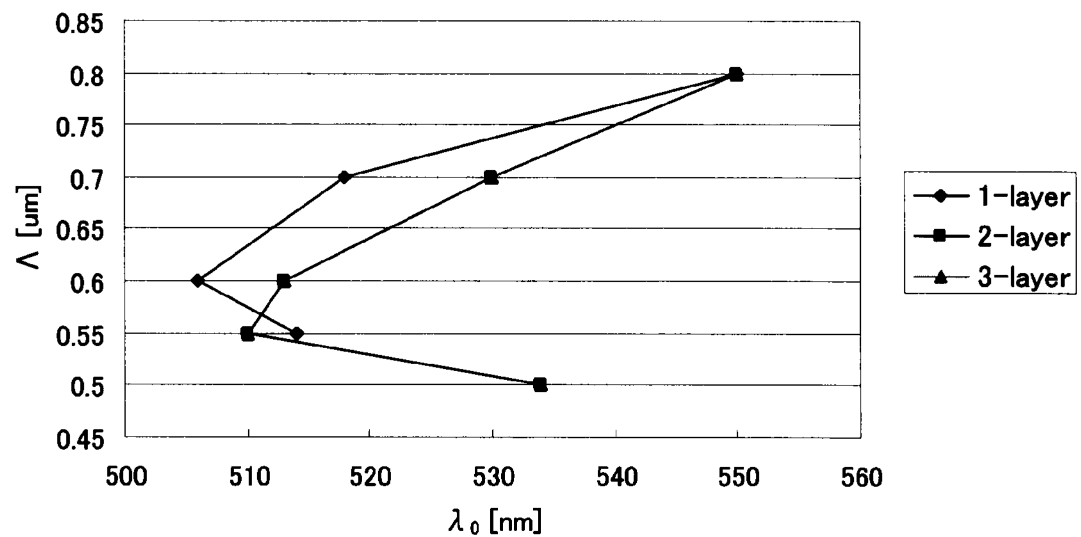
FIG. 14 is a graph which shows relationship between a zero-dispersion wavelength, λ0, and Λ, with d/Λ of 0.97 for one to three layer(s) in a holey fiber.

FIG. 14 is a graph which shows relationship between a zero-dispersion wavelength, λ0, and Λ, with d/Λ of 0.97 for each of three different layers in a holey fiber. As FIG. 14 shows, the zero-dispersion wavelength does not change substantially even the number of layers is changed.

Figure 15:
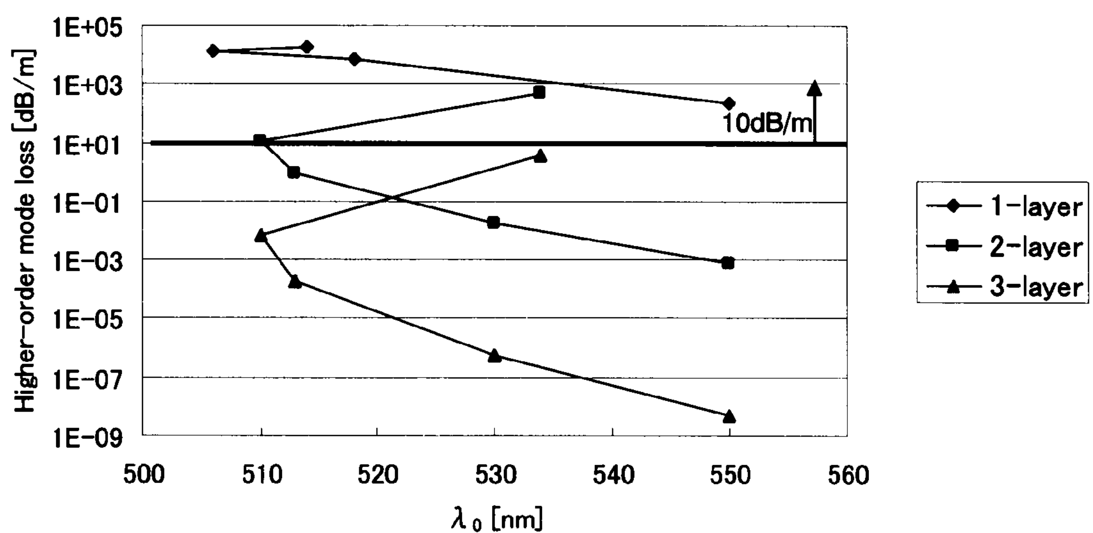
FIG. 15 is a graph which shows relationship between a zero-dispersion wavelength, λ0, and confinement loss of a higher order mode, with d/Λ of 0.97 for one to three layers in a holey fiber.
Figure 16:
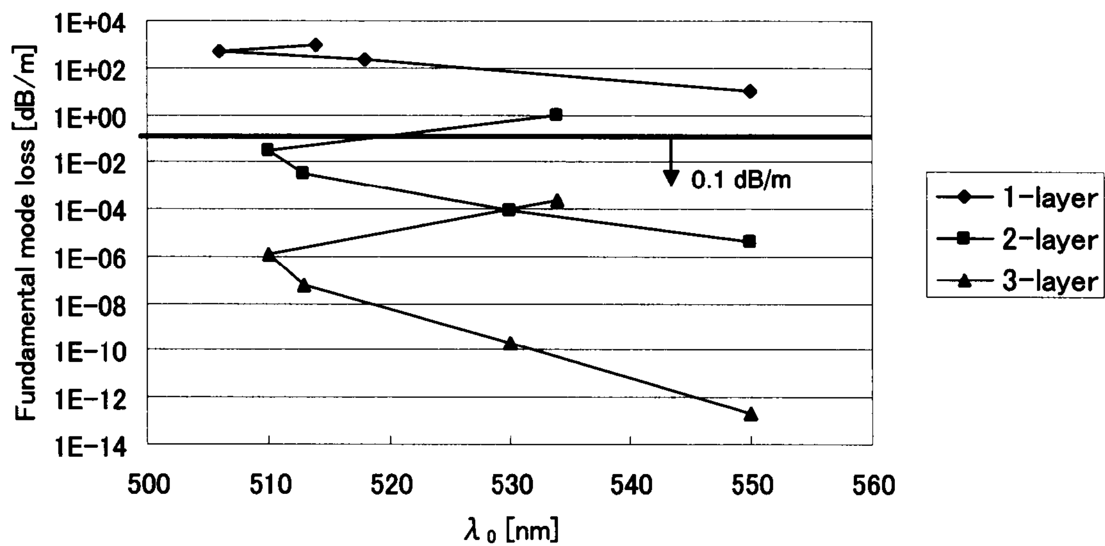
FIG. 16 is a graph which shows relationship between a zero-dispersion wavelength, λ0, and confinement loss of a fundamental mode, with d/Λ of 0.97 for one to three layers in a holey fiber.

On the other hand, FIG. 15 is a graph which shows relationships between a zero-dispersion wavelength, λ0, and confinement loss of a higher order mode, and between the zero-dispersion wavelength, λ0, and confinement loss of a fundamental mode, respectively, with d/Λ of 0.97 for each of three different layers in a holey fiber. Also, each data points in FIGS. 15 and 16 correspond with each data points in FIG. 14. If number of the layer is three, as FIG. 15 shows, confinement loss of the higher order mode becomes smaller and the light in the higher order mode may not attenuate and propagates within the holey fiber. It creates mode interference and degrades quality of the propagating light. On the other hand, if number of the layer is one, as FIG. 16 shows, confinement loss of the fundamental mode becomes larger and it makes difficult to propagate the light in good condition. Then, if number of the layer is two, confinement loss of the fundamental mode is sufficiently small and confinement loss of the higher order mode is sufficiently large. Therefore, the fiber can operate as single mode.

Figure 17:
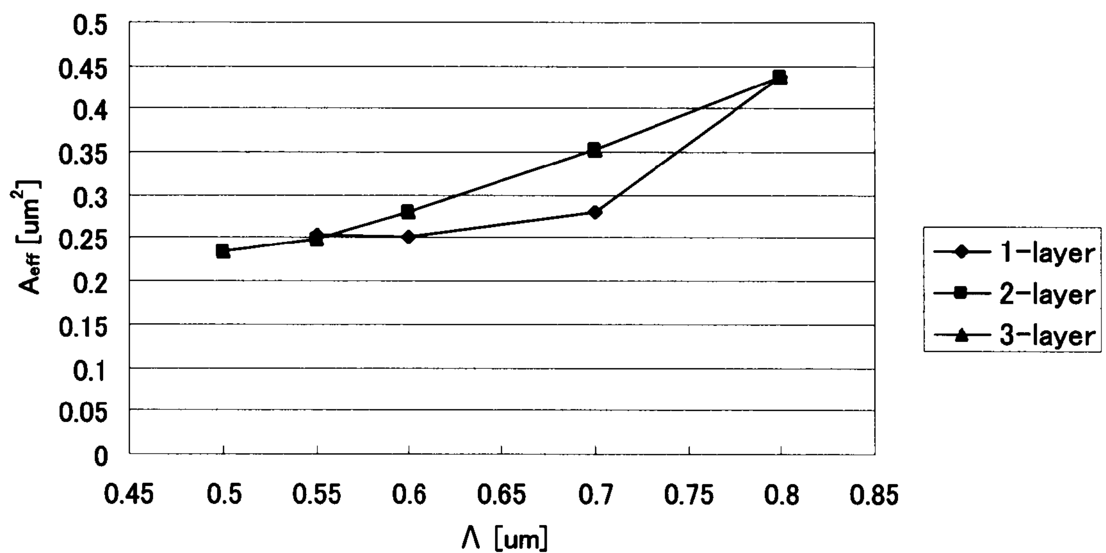
FIG. 17 is a graph which shows relationship between Λ and effective core cross area, Aeff, with d/Λ of 0.97 for one to three layers in a holey fiber.

FIG. 17 is a graph which shows relationship between Λ and effective core cross area, Aeff, with d/Λ of 0.97 for each of three different layers in a holey fiber. As FIG. 17 shows, effective core cross area also (same as for the zero-dispersion wavelength) does not change substantially even the number of layers is changed.

What is claimed is:

1. A holey fiber comprising:

a core region that is formed at a center of the holey fiber; and a cladding region, formed at a circumference of the core region, and having a plurality of holes distributed as a triangle lattice around the core region, wherein the holey fiber has a fundamental mode zero-dispersion wavelength of less than 700 nm and a higher order mode at the fundamental mode zero-dispersion wavelength, and fundamental mode and higher order mode confinement losses are less than 0.1 dB/m and more than 10 dB/m, respectively, at the fundamental mode zero-dispersion wavelength, d/Λ is in a range of 0.7 to 0.97 and Λ is a range of 0.55 to 1.2 μm, where d is a diameter of the holes in μm and Λ is a lattice constant of a triangle lattice.

2. The holey fiber of claim 1, wherein the plurality of the holes create a two-layer of equilateral hexagon shape around the core region.

* * * * *